United States Patent [19]

Cipolli et al.

[11] Patent Number: 5,302,640
[45] Date of Patent: Apr. 12, 1994

[54] SELF-EXTINGUISHING POLYMERIC COMPOSITIONS

[75] Inventors: Roberto Cipolli, Novara; Roberto Oriani, Milan; Enrico Masarati, Piacenza; Gilberto Nucida, Milan, all of Italy

[73] Assignee: Ministero Dell 'Universita' E Della Ricerca Scientifica E Technologica, Rome, Italy

[21] Appl. No.: 976,337

[22] Filed: Nov. 13, 1992

[30] Foreign Application Priority Data

Nov. 14, 1991 [IT] Italy .............. MI91-A-003040

[51] Int. Cl.$^5$ .......................................... C08K 5/3492
[52] U.S. Cl. .................................. 524/100; 524/96; 524/415; 524/416
[58] Field of Search ............... 524/96, 100, 415, 416

[56] References Cited

U.S. PATENT DOCUMENTS

| | | | |
|---|---|---|---|
| 4,504,610 | 3/1985 | Fontanelli et al. | 524/96 |
| 5,096,961 | 3/1992 | Eberspach | 524/707 |
| 5,153,245 | 10/1992 | Cipolli et al. | 524/96 |

FOREIGN PATENT DOCUMENTS

| | | |
|---|---|---|
| 0014463 | 8/1980 | European Pat. Off. . |
| 0406810 | 1/1991 | European Pat. Off. . |
| 1055555 | 1/1967 | United Kingdom . |
| 1286661 | 8/1972 | United Kingdom . |

Primary Examiner—Kriellion S. Morgan
Attorney, Agent, or Firm—Oblon, Spivak, McClelland, Maier & Neustadt

[57] ABSTRACT

Self-extinguishing, thermoplastic, polymeric compositions comprising a phosphorus derivative and condensation compounds obtained by polymerizing polyaminic compositions essentially constituted by derivatives of 2,4,6-triamino-1,3,5-triazine, having the general formula (I):

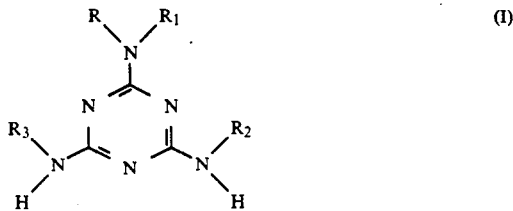

with aldehydes, preferably formaldehyde.

15 Claims, No Drawings

SELF-EXTINGUISHING POLYMERIC COMPOSITIONS

The present invention relates to self-extinguishing polymeric compositions based on thermoplastic polymers or on polymers endowed with elastomeric properties, in particular olefinic polymers or copolymers, containing aminoplastic resins in combination with ammonium or amine phosphates and/or phosphonates.

In the art several solutions are known in order to reduce or eliminate combustibility of polymers. Some of such solutions are based on the use of metal compounds, in particular compounds of antimony, bismuth or arsenic, in combination with partially halogenated, thermally unstable organic compounds, such as chlorinated paraffinic waxes.

Other solutions are based on the use of substances capable of causing intumescence. The formulation of intumescent type are generally constituted by the polymer and at least three main additives: one essentially phosphorus containing additive, whose purpose is of forming, during the combustion, a semi-solid, solid, impermeable glassy layer essentially constituted by polyphosphoric acid, and of initiating the process of intumescence formation; a second, nitrogen containing, additive, which performs the task of foaming agent; and a third, carbon containing, additive, which acts as a carbon donor, in order to form an insulating, celullar carbonaceous layer (char) between the polymer and the flame.

Examples of this type of intumescent formulations are those as reported in the following patents: U.S. Pat. No. 3,810,862 (Phillips Petroleum Co.), based on melamine, pentaerythritol and ammonium polyphosphate, U.S. Pat. No. 4,727,102 (Vamp S. r. L.), based on melamine cyanurate, a hydroxyalkyl derivative of isocyanuric acid and ammonium polyphosphate, and published patent application WO 85/05626 (Plascoat U.K. Limited), based on various phosphorus and nitrogen compounds among which, in particular, a combination of melamine phosphate, pentaerythritol and ammonium polyphosphate may be cited.

In more recent formulations, together with the use of an organic or inorganic phosphorus compound, a nitrogen containing organic compound was used, in general an aminoplastic resin obtained by means of the condensation of urea, melamine or dicyandiamine with formaldehyde.

Examples of double-additive formulations are those as reported in U.S. Pat. No. 4,504,610 (Montedison S.p.A.) based on oligomeric derivatives of 1,3,5-triazine and ammonium polyphosphate, and European patent No. 14,463 (Montedison S.p.A.), based on organic compounds selected from benzylguanamine and reaction products of aldehydes with various nitrogen-containing cyclic compounds, in particular benzylguanamine-formaldehyde copolymers, and ammonium polyphosphate.

Self-extinguishing compositions can also be obtained by using single-component additives, containing both nitrogen and phosphorus in their organic molecule, as disclosed in U.S. Pat. No. 4,201,705 Borg-Warner Corp.).

These intumescent flame-retardant systems endow the polymer which contains them with the property of giving rise to the formation of carbonaceous residue following a fire or the application of a flame. This type of flame-retardant systems display a number of advantages: absence of phenomena of corrosion in the machinery on which polymers are processed; lower smoke emission than as of those systems which contain metal compounds and halogenated hydrocarbons; and, above all, the possibility of endowing the polymers with satisfactory flame-retardant properties with a smaller amount of total additive, and, therefore, without an excessive decay in mechanical properties of the same polymers.

The present Applicant has found now that excellent characteristics of self-extinguishment can be given to the polymers by means of the use of a novel class of simple structure aminoplastic resins obtained from the polycondensation with aldehydes, preferably formaldehyde, of polyaminic compositions essentially constituted by derivatives of 2,4,6-triamino-1,3,5-triazine, modified with a suitable substituent selected from those disclosed in the following.

As mentioned above, in the art (European patent EP 14,463) reaction products of aldehydes with various nitrogenous cyclic compounds are known which can be used, together with ammonium phosphate, for self-extinguishing compositions in various polymeric matrices, in particular polyolefins.

Although such compounds, such as, for example, ethyleneurea-formaldehyde copolymer, display a good activity as flame-retardant agents, they supply the polymeric compositions which contain them with a limited heat stability both during their processing steps (extrusion and moulding) and to thermooxidation, and furthermore require, in order to perform their action, a rather high content of phosphorus containing co-additive.

Other compounds, such as, e.g., melamine-formaldehyde copolymer, result to be unable to endow the above said polymers with self-extinguishing characteristics.

Also the use of mixed compounds, such as, e.g., ethyleneurea-melamine-formaldehyde, is not enough in order to cause the polymeric compositions to reach satisfactory values of heat stability, although it contributes to improve it.

On the contrary, the additives according to the present invention, besides requiring a smaller content of phosphorus-containing co-additive, make it possible polymeric compositions to be obtained which are endowed with:

(1) excellent self-extinguishing characteristics with a total content of additives which is lower than as necessary when the aminoplastic resins known from the prior art are used, hence making it possible savings in formulation costs to be obtained together with a further decrease in decay of mechanical properties of the same polymers;

(2) good thermal stability both to thermooxidation and during the processing step, thus making it possible the compounding process to be carried out at higher temperatures than as allowed by the aminoplastic resins known from the prior art.

Besides showing good stability to heating, thus retaining a high activity as flame retardants also after undergoing the high-temperature processing
of the polymeric compositions which contain them,
said additives display a complete water insolubility.

Finally, the polymeric compositions according to the present invention display the advantage that they, in the case of a fire, give rise to a very moderate and non obscuring smoke emission.

Therefore, the subject matter of the present invention are the self-extinguishing compositions comprising:

(a) from 90 to 40 parts by weight of a thermoplastic polymer, or of a polymer endowed with elastomeric properties;

(b) from 6 to 33, preferably from 8 to 30, parts by weight of one or more ammonium or amine phosphate and/or phosphonates;

(c) from 4 to 27, preferably from 5 to 20, parts by weight of one or more aminoplastic resin(s), obtained by means of the polymerization of a mixture comprising:

(1) from 0 to 50 parts by weight of one or more polyaminic derivatives;

(2) from 50 to 100 parts by weight of one or more derivatives of 2,4,6-triamino-1,3,5-triazine having the general formula (I):

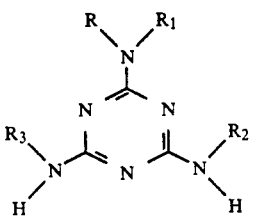

with formaldehyde or a mixture of formaldehyde and an aldehyde having the general formula (II):

$$R_4-CHO \quad (II)$$

wherein the aldehyde having the general formula (II) can be present in an amount of up to 20% by mol, and wherein at least one of radicals from R to $R_3$ is:

$$-CH_2-(C_mH_{2m})-O-R_5$$

$$-CH_2-(C_pH_{2p})-N(R_6)_2$$

wherein:

m = an integer comprised within the range of from 1 to 7, and preferably comprised within the range of from 1 to 3;

p = an integer comprised within the range of from 1 to 5;

$R_5$ = H; $C_1-C_8$ alkyl, preferably H or $C_1-C_4$ alkyl; $C_2-C_6$ alkenyl; $-(C_qH_{2q})-O-R_7$ wherein q is an integer comprised within the range of from 1 to 4 and $R_7$ is H or $C_1-C_4$ alkyl; $C_6-C_{12}$ cycloalkyl or alkylcycloalkyl;

the radicals $R_6$, which may be the same, or different from each other, are: H, $C_1-C_8$ alkyl; $C_2-C_6$ alkenyl; $C_6-C_{12}$ cycloalkyl or alkylcycloalkyl; $C_1-C_4$ hydroxyalkyl; or the moiety:

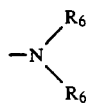

is replaced by a heterocyclic radical linked to the alkyl chain through the nitrogen atom, and possibly containing another heteroatom preferably selected from O, S, N;

or in the general formula (I) the moiety:

is replaced by a heterocyclic radical linked to the triazinic ring through the nitrogen atom, and possibly containing another heteroatom preferably selected from O, S, N;

the other radicals from R to $R_3$, which may be the same or different from one another, have the above said meaning, or they are:

H; $C_1-C_{18}$ alkyl; $C_2-C_8$ alkenyl; $C_6-C_{16}$ cycloalkyl or alkylcycloalkyl, possibly substituted with a hydroxy or $C_1-C_4$ hydroxyalkyl function.

$R_4$ is $C_1-C_8$ alkyl; $C_2-C_6$ alkenyl; $C_6-C_{12}$ cycloalkyl; $C_6-C_{12}$ aryl, possibily substituted with one or more $C_1-C_4$ alkyl radicals; $C_7-C_{16}$ aralkyl; $C_8-C_{12}$ aralkenyl.

Particularly preferred are those polymeric compositions in which the (c) component is obtained by means of polycondensation with formaldehyde or those in which $R_2$ and $R_3$, in general formula (I), are equal to hydrogen.

Preferably, the (c) component is selected from polycondensates obtained by means of resinification of the only derivatives of general formula (I).

The same self-extinguishing characteristics are obtained by blending the polycondensation products obtained by separately resinifying the components (1) and (2) with aldehydes.

According to a preferred form of practical embodiment of the compositions according to the present invention, the polyaminic derivative is selected from compounds containing the 1,3,5-triazine ring, or at least one <C=O and/or <C=S moiety.

Examples of radicals from R to $R_3$ in general formula (I) are:

methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5--propoxypentyl; 2-cyclohexyloxyethyl; 2-ethenyloxyethyl; 2-(N,N-dimethylamino) ethyl; 3-(N,N-dimethylamino) propyl; 4-(N,N-dimethylamino) butyl; 5-(N,N-diethylamino) pentyl; 4-(N,N-diethylamino) butyl; 5-(N,N-diethylamino) pentyl; 5-(N,N-diisopropylamino)-pentyl; 3-(N-ethylamino) propyl; 4-(N-methylamino)-butyl; 4-(N,N-dipropylamino) butyl; 2-(N,N-diisopropylamino) ethyl; 6-(N-hexenylamino) hexyl; 2-(N-ethenylamino) ethyl; 2-(N-cyclohexylamino) ethyl; 2-(N-2-hydroxyethylamino) ethyl 2-(2- hydroxyethoxy)-ethyl; 2-(2-methoxyethoxy) ethyl; 6-(N-propylamino)-hexyl; and so forth.

Examples of heterocyclic radicals which may replace the moiety:

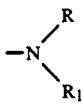

in general formula (I) are:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

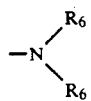

are:

aziridine; pyrrolidine; piperidine; morpholine; thiomorpholine; piperazine; 4-methylpiperazine; 4-ethylpiperazine; and so forth.

By "formaldehyde", as this term is used in the instant disclosure and in the appended claims, any forms are meant, in which formaldehyde is usually marketed, i.e., aqueous solution, metaformaldehyde, paraformaldehyde.

Examples for $R_4$ radical in general formula (II) are: methyl, ethyl; n-propyl; isopropyl; n-butyl; isobutyl; tert-butyl; n-pentyl; isopentyl; n-hexyl; n-heptyl; isoheptyl; n-octyl; ethenyl; propenyl; isobutenyl; sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl; and so forth.

Examples of polyaminic derivatives are:

urea; ethyleneurea; propyleneurea; thiourea; ethylenethiourea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

The aminoplastic resins according to the present invention can be synthetized as follows:

(a) by causing the derivative of 2,4,6-triamino-1,3,5-triazine having the general formula (I), either mixed or not mixed with the polyaminic derivative, to react, in a suitable solvent (such as, e.g., water, methyl alcohol, ethyl alcohol, or their mixtures, and so forth), with formaldehyde, or a mixture of formaldehyde and an aldehyde of general formula (II). The molar ratio of the derivative of general formula (I), or of its mixture with the polyaminic derivative, to formaldehyde, or to the mixture of formaldehyde with the aldehyde of general formula (II), is comprised within the range of from 1:1 to 1:6.

The reaction is carried out at a pH value comprised within the range of from 7 to 12, possibly obtained by adding an alkali (such as, for example, potassium carbonate, sodium carbonate, sodium hydroxide, and so forth), at temperatures comprised within the range of from 20° C. to solvent boiling point, until a solution is obtained;

(b) causing the resulting reaction product, constituted by the alkylol derivative, to turn into a resin by feeding it to a mixture of the same solvent, acidified at a pH value comprised within the range of from 1 to 5, by means of the addition of an acid (such as, e.g., sulfuric acid, hydrochloric acid, phosphoric acid, and so forth) and heated at a temperature comprised within the range of from 40° C. up to the boiling point of the solvent. The resin is formed as a finely subdivided solid material of white colour. The resulting dispersion is kept further stirred at the selected temperature, during the necessary time to complete the polymerization process, preferably of from 1 to 12 hours. The acidity of the resulting mixture is then neutralized with a base selected from those suggested hereinabove, and the resulting product is filtered off.

The resin is first dried at 100° C., then is submitted to thermal treatment for some hours, preferably of from 1 to 3 hours, in a vacuum oven at 150° C.

In general good quality aminoplastic resins are obtained as white crystalline powders, which are insoluble in water and can be used in self-extinguishing extinguishing polymeric compositions without any further purification.

An alternative synthesis method consists in causing the reactions of the above (a) and (b) steps to take place as one single step, at a pH value comprised within the range of from 1 to 5, and at higher temperature than 40° C.

Many of derivatives of 2,4,6-triamino-1,3,5-triazine of general formula (I) are known; they can anyway be easily synthetized according to as disclosed in European Patent application publication No. 406,810, to the same Applicant's name.

Among phosphates, those ammonium polyphosphates are preferred which are encompassed by the general formula $$(NH_4)_{n+2}P_nO_{3n+1}$$

in which n is an integer equal to, or higher than, 2; the molecular weight of polyphosphates should preferably be high enough in order to secure a low water solubility. For indicative purposes, n is preferably comprised within the range of from 2 to 500.

The composition of polyphosphates falling within the scope of the above indicated formula, in which n is a large enough number, and preferably comprised within the range of from 50 to 500, is practically that composition which corresponds to the formula of metaphosphates $$(NH_4PO_3)_n.$$

An example of such polyphosphates is the product known under the trade name "Exolit 422" (produced and traded by Hoechst) and having the composition $(NH_4PO_3)_n$ in which n is higher than 50; another example is the product known under the trade name "Phos- Check P/40" (Monsanto Chemical), and having a similar composition.

Another polyphosphate which can be advantageously used, above all owing to its reduced water solubility, is the product known under the trade name "Exolit 462" (produced and traded by Hoechst), and corresponding to Exolit 422 microencapsulated in melamine-formaldehyde resin.

Other phosphates which may be used are those deriving from amines, such as, e.g., dimethylammonium or diethylammonium phosphate, ethylenediamine phosphate, or melamine ortho- or pyro-phosphate.

Among phosphonates, extremely good results were obtained by using (mono- or poly-substituted) ammonium phosphonates derived from mono- and poly-phosphonic acids, examples of which are the following:

ethane-1,1,2-triphosphonic acid; ethane-2-hydroxy-1,1,2-triphosphonic acid; propane1,2,3-triphosphonic acid; methylphosphonic acid; ethylphosphonic acid; n-propylphosphonic acid, n-butyl-phosphonic acid; phenylphosphonic acid; ethane-1-amino-1,1-diphosphonic acid; ethane-1-hydroxy-1,1-diphosphonic acid; dodecane-1-hydroxy-1,1-diphosphonic acid; acid; 2-phosphonopropionic acid; 3-phosphonopropionic acid; 2-phosphonobutyric acid; 4-phosphonobutyric acid; amino tris (methylenephosphonic) acid; ethylenediamino-tetra (methylenephosphonic) acid; hexamethylenediamino-tetra (methylenephosphonic) acid; diethylenetriamino-penta(-methylene phosphonic) acid; and so forth.

Among those polymers which can be used in the composition of the present invention, preferred are polymers or copolymers of olefins having the general formula $R-CH=CH_2$ wherein R is a hydrogen atom or a $C_1-C_8$ alkyl or aryl radical, in particular:

1. isotactic or prevailingly isotactic polypropylene;
2. HDPE, LLDPE, LDPE polyethylene;
3. crystalline propylene copolymers with minor proportions of ethylene and/or other alpha-olefins, such as, e.g., 1-butene, 1-hexene, 1-octene, 4-methyl-1-pentene;
4. heterophasic compositions comprising: (A) a homopolymeric propylene fraction, or one of copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene. Examples of dienes which are more commonly contained in the above said elastomeric copolymers are butadiene, ethylidene-norbornene, hexadiene 1-4. Among polymers of olefins having formula $R-CH=CH_2$ in which R is an aryl radical, "crystal" and high-impact polystyrene are preferred.

Other examples of polymers which may commonly be used are acrylonitrile/butadiene/styrene (ABS) and styrene/acrylonitrile (SAN) copolymers; (polyester and polyether) polyurethane; poly(ethylene terephthalate); poly(butylene terephthalate); polyamides; and so forth.

The self-extinguishing compositions according to the present invention can be prepared according to well-known methods: for example, ammonium or amine phosphate and/or phosphate is first intimately mixed with one or more aminoplastic resin(s), the resulting blend is finely ground (preferably down to a smaller particle size than 70 micrometers), and the resulting mixture is added to the polymer in a turbomixer, in order to form a homogeneous compound which is extruded and pelletized. The resulting granular product can be transformed into various articles of manifacture according to any of the well-known molding techniques.

The flame-retardant additives according to the present invention are suitable for use also in the field of flame-retarding paints.

Condensation compounds obtained by polimerising with aldehydes, preferably formaldehyde, the melaminic derivatives of general formula (I), either containing or not containing polyaminic derivatives, not cited in the examples, but which can be advantageously used as well in the self-extinguishing polymeric compositions according to the present invention, are those as reported in following table 1.

TABLE 1

| COMPOUND N° | Derivative of general formula (1) | | | Polyaminic derivative | | $R_4$—CHO | | Molar ratio polyamines/aldehydes |
|---|---|---|---|---|---|---|---|---|
| | $R-N-R_1$ | $R_2$ | $R_3$ | Designation | % by weight | $R_4$ | Mol % | |
| 1 | 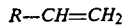 (N–NH ring) | H | H | — | | — | | 1:6 |
| 2 | $CH_2CH_2OCH_3$ | H | H | H | Benzoguanamine | 30 | — | | 1:3 |
| 3 | $(CH_2)_5OH$ | H | H | H | — | | — | | 1:5 |
| 4 |  (N–O ring) | H | H | — | | $n-C_3H_7$ | 10 | 1:1.5 |

TABLE 1-continued

| COMPOUND N° | Derivative of general formula (1) | | | Polyaminic derivative | | R₄—CHO | | Molar ratio polyamines/ aldehydes |
|---|---|---|---|---|---|---|---|---|
| | R—N—R₁ | R₂ | R₃ | Designation | % by weight | R₄ | Mol % | |
| 5 | morpholine (N—O ring) | H | H | Acetoguanamine | 25 | — | | 1:2.5 |
| 6 | (CH₂)₂OH | cyclohexyl | H | H | — | — | | 1:2 |
| 7 | (CH₂)₃N(C₂H₅)₂ | H | H | H | — | — | | 1:4 |
| 8 | CH₂CH₂OH | H | H | H | Ethyleneurea | 15 | — | | 1:2 |
| 9 | CH₂CH₂OCH₃ | H | CH₂CH₂OCH₃ | H | Succinoguanamime | 15 | — | | 1:2.8 |
| 10 | CH₂CH₂OH | H | H | H | urea | 20 | — | | 1:2.5 |
| 11 | thiomorpholine (N—S ring) | H | H | — | | i-C₄H₉ | 5 | 1:2 |
| 12 | morpholine (N—O ring) | t-C₄H₉ | H | — | | — | | 1:3 |
| 13 | piperidine (N ring) | H | H | — | | — | | 1:2.5 |
| 14 | (CH₂)₂OCH₃ | (CH₂)₂OCH₃ | H | H | Benzylguanamine | 15 | — | | 1:3 |
| 15 | (CH₂)₂O(CH₂)₂OH | H | H | H | — | | — | | 1:4 |
| 16 | thiomorpholine (N—S ring) | H | H | Ethyleneurea | 25 | — | | 1:1.5 |
| 17 | CH₂CH₂OH | H | H | H | Melamine | 30 | — | | 1:5 |
| 18 | (CH₂)₃OCH₃ | H | (CH₂)₃OCH₃ | (CH₂)₃OCH₃ | — | | — | | 1:2.8 |
| 19 | N-methylpiperazine (N—N—CH₃ ring) | H | H | Melamine | 50 | — | | 1:4.5 |
| 20 | CH₂CH₂OH | H | CH₂CH₂OH | H | — | | — | | 1:3 |
| 21 | thiomorpholine (N—S ring) | H | H | — | | — | | 1:2 |
| 22 | (CH₂)₃OC₂H₅ | H | H | H | — | | — | | 1:2.5 |
| 23 | morpholine (N—O ring) | (CH₂)₂OCH₃ | H | — | | — | | 1:1 |
| 24 | morpholine (N—O ring) | H | H | Piperazine-2,5-dione | 10 | — | | 1:3 |

TABLE 1-continued

| COMPOUND N° | Derivative of general formula (1) R—N—R₁ | R₂ | R₃ | Polyaminic derivative Designation | % by weight | R₄—CHO R₄ | Mol % | Molar ratio polyamines/ aldehydes |
|---|---|---|---|---|---|---|---|---|
| 25 | 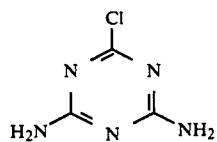 | H | H | — | | $C_2H_5$ | 15 | 1:2.5 |
| 26 | N O (morpholino ring) | H | H | Melamine | 25 | $i$-$C_3H_7$ | 8 | 1:3.5 |
| 27 | $CH_2CH_2OCH_3$ | H | $C_2H_5$ | $C_2H_5$ | — | — | | 1:2.5 |

The examples reported in the following illustrate the characteristics of the invention without limiting them.

EXAMPLE 1

184.5 g of cyanuric chloride and 800 cm³ of acetone are charged to a reactor of 3 liters of capacity, equipped with stirrer, thermometer, dripping funnel, reflux condenser and heating bath.

With stirring, the reaction mixture is heated up to 40° C. in order to obtain a solution, then 284 g of an aqueous solution of ammonia at 30% by weight are added during a 1 hour and 30 minutes time, with the reaction temperature being always kept at 40° C.

The reaction mixture is subsequently heated up to 45° C. and is kept 4 hours at this temperature.

After cooling, the resulting product is filtered off and is washed on the filter with water.

After oven drying at 50°-60° C. under vacuum, 113 g of intermediate (III):

(III)

are obtained as a white, infusible, crystalline powder containing 24.12% of chlorine (theoretical chlorine content=24.36%).

72.8 of intermediate (III), 350 cm³ of water and then, with stirring, 44 g of piperidine are charged to a reaction vessel of 1 liter of capacity equipped with stirrer, thermometer, addition funnel, reflux condenser and heating bath.

The reaction mixture is heated up to boiling temperature and then is kept under refluxing conditions for 4 hours.

The reaction mixture is then caused to reflux for a further 8 hours, with 20 g of sodium hydroxide in 50 cm³ of water being added portionwise, so as to keep the reaction mixture pH value comprised within the range of from 7 to 8.

The reaction mixture is cooled down to room temperature, the resulting product is filtered off, and the filter cake is washed on the same filter with cold water.

After drying in an oven at 60° C. under vacuum, 90 g of 2,4-diamino-6-piperidino-1,3,5-triazine (IV):

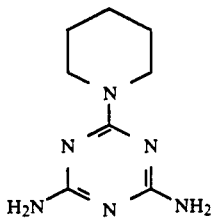

(IV)

are obtained as a white crystal powder having m.p.=215°-217° C. (m.p.=melting point).

The structure of intermediates (III) and (IV) was confirmed by IR spectroscopic analysis.

300 cm³ of water, 0.7 g of sodium carbonate, 114.3 g of an aqueous solution at 37% by weight of formaldehyde and, with stirring, 78 g of intermediate (IV), are charged to the same reactor of 1 liter of capacity.

The reaction mass is heated up to 65° C., until a solution is obtained (about 1 hour).

The resulting solution, kept at 65° C., is added, during a 2 hour time, to a reactor of 2 liters of capacity, equipped in the same way as the preceding reactors, containing 380 cm³ of water and 3.0 g of sulfuric acid at 96%, heated at 90°-95° C. A white precipitate is formed.

When addition is complete, the resulting dispersion is heated up to boiling temperature and is kept refluxing for 3 hours.

Then 450 cm³ of water are added, with the temperature being allowed to decrease down to 60° C., and the reaction mass is subsequently neutralized by adding 2.4 g of sodium carbonate.

The reaction mass is kept at the temperature of 60° C. for 1 hour, and the resulting product is subsequently filtered, with the filter cake being washed on the same filter with hot water.

By drying the filter cake in an oven at 100° C., and subsequently submitting it to a thermal treatment at 150° C. for 2 hours under vacuum, 84.8 g of resin are obtained as a white crystalline powder having a melting point higher than 300° C.

EXAMPLE 2

91 g of intermediate (III), 240 cm³ of toluene and 100 g of morpholine are charged to the same reaction equipment of 1 liter of capacity as disclosed in Example 1.

The reaction mixture is heated up to 65°-70° C. and is kept at that temperature for 2 hours; the reaction mixture is then heated up to boiling temperature and is kept refluxing for 1 hour.

The reaction mixture is allowed to cool down to room temperature, and then the resulting product is isolated by filtration. The filter cake is washed with plentiful water, and, after drying, 92 g of 2,4-diamino-6-morpholino-1,3,5-triazine (V):

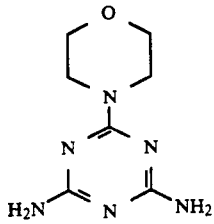
(V)

are obtained as a white crystalline powder with m.p.=248°-250° C.

The structure of intermediate (V) was confirmed by NMR analysis.

300 cm³ of water, 0.7 g of sodium carbonate, 91.2 g of a solution at 37% by weight of formaldehyde, and, with stirring, 73.5 g of intermediate (V) are charged to the same reactor of 1 liter of capacity.

The reaction mass is heated at 65° C. for 15 minutes, until a solution is obtained.

Such a solution, kept at 65° C., is fed, during a 2 hour time, to the same reactor of 2 liters of capacity as disclosed in Example 1, containing 350 cm³ of water and 3.0 g of sulfuric acid at 96%, heated at 90° C.

A white solid is formed. The reaction mixture is heated up to boiling temperature and is kept under refluxing conditions for 3 hours.

450 cm³ of water are added, with the temperature being allowed to decrease down to 60° C., and the reaction mass is neutralized by means of the addition of 2.4 g of sodium carbonate.

Then, by proceeding as disclosed in Example 1, 77.3 g of resin is obtained as a white crystalline powder having a melting point higher than 300° C.

EXAMPLE 3

184.5 g of cyanuric chloride and 1300 cm³ of methylene chloride are charged to the same equipment of 3 liters of capacity as disclosed in Example 1, but initially equipped with a cooling bath.

With cooling from the outside, 87.2 g of morpholine and 40 g of sodium hydroxide dissolved in 150 cm³ are simultaneously added during a 3 hour time, with the reaction pH being kept comprised within the range of from 5 to 7, and the temperature being kept comprised within the range of from 0° to 3° C.

The temperature of 0°-3° C. is maintained for a further 3 hours, then the aqueous phase is separated.

By distilling methylene chloride off, 230 g of intermediate (VI):

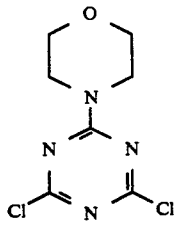
(VI)

are obtained as a white crystalline powder with m.p.=155°-157° C.; purity higher than 98% (as determined by gas-chromatography) and a chlorine content of 29.87% (theoretical value: 30.21%).

100 g of a solution at 30% by weight of ammonia, 100 cm³ of water and 70.5 g of intermediate (VI) are charged to a reactor of 0.5 liter of capacity, equipped as in Example 1.

The reaction mixture is firstly heated up to 50° C. and is kept 7 hours at this temperature; then is allowed to cool down to room temperature and the obtained product is filtered off and the filter cake is washed with water.

By drying the filter cake, 58 g of intermediate (VII):

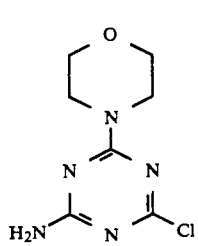
(VII)

are obtained as a white crystalline powder with m.p.=189°-191° C. and a chlorine content of 16.28% (theoretical value: 16.47%).

The structure of intermediates (VI) and (VII) was also confirmed by IR spectroscopic analysis.

58 g of intermediate (VII) and 300 cm³ of water and then, with stirring, 18 g of 2-aminoethanol are charged to the same reaction equipment as disclosed above.

The reaction mixture is heated up to boiling temperature and is allowed to reflux for 3 hours.

The reaction mixture is then allowed to reflux for a further 3 hours, while 11.8 g of sodium hydroxide in 50 cm³ of water is added portionwise, so as to keep the reaction pH value comprised within the range of from 7 to 8.

The reaction mass is cooled, the resulting product is filtered off, and the filter cake is washed with water.

After drying, 58 g of 2-amino-4-(2-hydroxyethyl)-amino-6-morpholino-1,3,5-triazine (VIII):

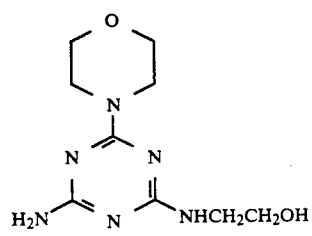
(VIII)

are obtained as a white crystalline powder with a melting point of 159°-161° C.

The structure of intermediate (VIII) was confirmed by IR spectroscopic analysis.

200 cm³ of water, 51.1 g of a solution at 37% by weight of formaldehyde, and, with stirring, 50.0 g of intermediate (VIII) are charged to the same reaction apparatus of 0.5 liter of capacity.

The reaction mixture is kept heated at 60° C. during 45 minutes, until a solution is obtained.

The resulting solution, kept at 60° C., is added during a 2-hour time to a reactor of 1 liter of capacity, fitted as the preceding ones, containing 250 cm³ of water and 3.7 g of an aqueous solution at 37% by weight of hydrochloric acid, heated at 90°-95° C. A white solid material is formed.

The reaction mass is heated up to boiling temperature and is kept refluxing for 3 hours.

250 cm³ of water are added, with the reaction temperature being allowed to decrease down to 60° C., and the reaction mass is neutralized by means of the addition of 1.5 g of sodium hydroxide.

Then, by proceeding as disclosed in Example 1, 52.1 g of resin are obtained as a white crystalline powder having m.p. higher than 300° C.

EXAMPLE 4

100 cm³ of methanol, 101.5 g of a solution at 37% by weight of formaldehyde and, with stirring, 49.0 g of intermediate (V) of Example 2 and 31.5 g of 2,4,6-triamino-1,3,5-triazine (melamine) are added to the same reaction equipment of 0.5 liter of capacity as disclosed in Example 3.

The reaction mass is heated up to 70° C. for 45 minutes, until a solution is obtained.

The resulting solution, kept at 70° C., is fed during a 30 minute time to a reactor of 2 liters of capacity fitted as the preceding reactors, containing 400 cm³ of water, 200 cm³ of methanol and 2.9 g of phosphoric acid at 85% by weight, heated up to 75° C.

A precipitate is not immediately formed.

Therefore, the solution is heated up to its boiling temperature and is kept refluxing for approximately 8 hours, during which a white solid precipitates.

350 cm³ of water are added, with the dispersion temperature being allowed to decrease down to 60° C., and the dispersion is then neutralized by means of the addition of 3.1 g of sodium hydroxide.

Then, by proceeding according to the operating modalities as disclosed in Example 1, 90 g of resin are obtained as a white crystallization powder having a melting point higher than 300° C.

EXAMPLE 5

350 cm³ of water, 72.8 g of intermediate (III) of Example 1, and then, with stirring, 68 g of N,N-bis (2-methoxyethyl) amine are charged to the same reactor of 1 liter of capacity as disclosed in Example 1.

The reaction mixture is heated up to boiling and is kept under refluxing conditions for 4 hours.

The reaction mixture is then allowed to reflux for a further 8 hours, while 20 g of sodium hydroxide in 50 cm³ of water is added portionwise, in order to keep the reaction pH value comprised within the range of from 7 to 8.

The reaction mixture is cooled down to room temperature, the resulting product is filtered off and the filter cake is washed on the same filter with water.

After drying in an oven at 60° C. under vacuum, 90 g of 2,4,-diamino-6-bis (2-methoxyethyl) amino-1,3,5-triazine (IX):

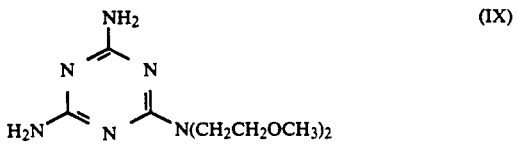

are obtained as a white crystalline powder having m.p.=124°-128° C.

The structure of intermediate (IX) was confirmed by NMR analysis.

320 cm³ of water, 1.0 g of potassium carbonate, 30 g of paraformaldehyde and, with stirring, 80.0 g of intermediate (IX) are charged to the same reactor of 1 liter of capacity.

The reaction mass is heated up to 60° C. for 20 minutes, until a solution is obtained.

The resulting solution, kept at 60° C., is added during a 1-hour time to a reactor of 2 liters of capacity, equipped as the preceding ones, containing 400 cm³ of water and 3.2 g of sulfuric acid at 96%, heated at 90° C.

A white precipitate is formed.

The reaction dispersion is kept at 90° C. for a further 4 hours, then 500 cm³ of water are added, with the reaction temperature being allowed to decrease down to 50° C., and the reaction mass is then neutralized by means of the addition of 3.2 g of potassium carbonate.

By subsequently proceeding as disclosed in Example 1, 88.7 g of resin are obtained as a crystalline white powder having a melting point higher than 300° C.

EXAMPLES 6-16

By operating under analogous conditions to as disclosed in Examples Nos. 1-5, the polycondensation products which are reported in following Table 2, and have melting points higher than 300° C., are prepared by causing the melaminic derivatives of general formula (I), either containing or not containing polyaminic derivatives, to react with formaldehyde.

TABLE 2

| EXAMPLE N° | Derivative of general formula (I) | | | Polyaminic derivative | | R₄—CHO | | Molar ratio polyamines/ aldehydes |
|---|---|---|---|---|---|---|---|---|
| | R—N—R₁ | R₂ | R₃ | Designation | % by weight | R₄ | Mol % | |
| 6 | CH₂CH₂OH     H | H | H | — | | — | | 1:2.5 |
| 7 |  | CH₂—CH=CH₂ | H | — | | — | | 1:2.5 |

TABLE 2-continued

| EXAMPLE N° | Derivative of general formula (I) R—N—R₁ | R₂ | R₃ | Polyaminic derivative Designation | % by weight | R₄—CHO R₄ | Mol % | Molar ratio polyamines/ aldehydes |
|---|---|---|---|---|---|---|---|---|
| 8 | N(⟩N—CH₃ (piperazine ring) | H | H | — | | — | | 1:3 |
| 9 | CH₂CH₂OH | H | CH₂CH₂OH | CH₂CH₂OH | — | | — | 1:2.2 |
| 10 | (CH₂)₃N(⟩O (morpholine ring) | H | H | H | — | | — | 1:2.5 |
| 11 | N(⟩O (morpholine ring) | H | H | H | Ethylene-urea | 40 | — | | 1:1.4 |
| 12 | (CH₂)₂OCH=CH₂ | H | H | H | — | | — | | 1:3 |
| 13 | (CH₂)₂OH | (CH₂)₂OH | H | H | — | | — | | 1:2.5 |
| 14 | N(⟩N—H (piperazine ring) | H | H | H | — | | — | | 1:5 |
| 15 | CH₂CH₂OCH₃ | H | (CH₂)₂OCH₃ | (CH₂)₂OCH₃ | — | | — | | 1:3 |
| 16 | CH₂CH₂OH | H | CH₂CH₂OH | H | — | | — | | 1:2.4 |

TABLES 3 AND 4

The tests reported in the above said tables relate to polymeric compositions containing the products of general formula (I) prepared according to the preceding examples.

Specimens were prepared as slabs having a thickness of approximately 3 mm, by moulding compounds consisting of granular polymer and additives, on a platen press MOORE, with a moulding time of 7 minutes, by operating under a pressure of 40 kg/cm².

On the resulting slabs, the level of self-extinguishment is determined by measuring the respective values of Oxygen Index (L.O.I. according to ASTM D-2863/77) on a STANTON REDCROFT instrument, and applying the "Vertical Burning Test", which makes it possible the material to be classified at the three levels 94 V-0, 94 V-1 and 94 V-2 according to UL 94 standards (published by "Underwriters Laboratories"—USA).

In Table 3, the values are reported which were obtained by using isotactic polypropylene flakes having a Melt Flow Index equal to 12, and containing 96% of insolubles in boiling n-heptane, by weight.

In Table 4, the values are reported which were obtained by using a low density polyethylene in granular form having a Melt Flow Index of 7; a granular polystyrene containing 5% by weight of polybutadienic rubber and having a Melt Flow Index equal to 9; a thermoplastic polyester polyurethane (ESTANE 54600(®)) ex Goodrich), and a thermoplastic polyether polyurethane (ESTANE 58300(®)) ex Goodrich), both in granular form, having specific gravity values of 1.19 and 1.10 g/cm³, respectively; an elastomeric ethylene-propylene copolymer containing 45% by weight of propylene; an acrylonitrile-butadiene-styrene terpolymer having a specific gravity of 1.06 g/cm³, a Melt Flow Index of 1.6 and containing approximately 40% of acrylonitrile and styrene and 20% of butadiene.

TABLE 3

| Example No. | Product of Example No. | Product | PP (1) | AO (2) | APP (1) | L.O.I. (ASTM D 2863) | UL94 3 mm |
|---|---|---|---|---|---|---|---|
| 17 | 1 | 8.5 | 75 | 1 | 15.5 | 31.0 | V0 |
| 18 | 2 | 7.0 | 78 | 1 | 14.0 | 31.4 | V0 |
| 19 | 2 | 14.5 | 70 | 1 | 14.5 | 33.0 | V0 |
| 20 | 3 | 5.5 | 81 | 1 | 12.5 | 29.4 | V1 |
| 21 | 3 | 8.0 | 75 | 1 | 16.0 | 34.7 | V0 |
| 22 | 4 | 6.8 | 75 | 1 | 17.2 | 30.8 | V0 |
| 23 | 5 | 8.7 | 73 | 1 | 17.3 | 33.2 | V0 |
| 24 | 6 | 10.0 | 74 | 1 | 15.0 | 32.4 | V0 |
| 25 | 7 | 9.0 | 75 | 1 | 15.0 | 31.8 | V0 |
| 26 | 8 | 5.5 | 80 | 1 | 13.5 | 29.8 | V0 |
| 27 | 8 | 9.7 | 70 | 1 | 19.3 | 35.5 | V0 |
| 28 | 9 | 6.8 | 75 | 1 | 17.2 | 33.1 | V0 |
| 29 | 10 | 8.0 | 75 | 1 | 16.0 | 32.8 | V0 |
| 30 | 11 | 6.8 | 75 | 1 | 17.2 | 33.6 | V0 |
| 31 | 12 | 8.0 | 75 | 1 | 16.0 | 31.9 | V0 |
| 32 | 13 | 6.3 | 77 | 1 | 15.7 | 33.8 | V0 |
| 33 | 14 | 6.3 | 77 | 1 | 15.7 | 31.2 | V0 |
| 34 | 15 | 6.0 | 75 | 1 | 18.0 | 34.0 | V0 |
| 35 | 16 | 9.0 | 77 | 1 | 13.0 | 33.4 | V0 |
| 36 | 2 | 8.0 | 75 | 1 | 16.0(*) | 32.5 | V0 |
| 37 | 3 | 11.6 | 70 | 1 | 17.4(*) | 34.7 | V0 |
| 38 | 8 | 11.0 | 70 | 1 | 18.0(3) | 32.2 | V0 |
| 39 | 5 | 8.3 | 70 | 1 | 20.7(4) | 34.2 | V0 |

(1) PP = polypropylene
APP = ammonium polyphosphate Exolit 422 ® (Hoechst)
(*)APP microencapsulated with melamine-formaldehyde resin Exolit 462 ® (Hoechst)
(2) AO = antioxidant
A mixture constituted by 2 parts of dilauryl thiopropionate and 1 part of pentaerythritol tetra [3-(3,5-di-ter-butyl-4-hydroxyphenyl)propionate].
(3)APP was replaced with monoammonium salt of ethane-1-amino-1,1-diphosphonic acid.
(4)APP was replaced with monoammonium salt of ethane-1-hydroxy-1,1-diphosphonic acid.

TABLE 4

| Example No. | Polymeric Support (1) | Product of Example No. | PARTS BY WEIGHT Product | Polymer | AO (2) | APP (1) | L.O.I. (ASTM D 2863) | UL94 3 mm |
|---|---|---|---|---|---|---|---|---|
| 40 | LDPE | 3 | 8.5 | 65 | 1 | 25.5 | 34.8 | V0 |
| 41 | LDPE | 5 | 8.3 | 70 | 1 | 20.7 | 30.4 | V1 |
| 42 | HIPS | 2 | 8.5 | 65 | 1 | 25.5 | 31.2 | V1 |
| 43 | HIPS | 3 | 9.7 | 65 | 1 | 24.3 | 32.2 | V0 |
| 44 | (ester) PU | 2 | 8.3 | 70 | 1 | 20.7 | 37.0 | V0 |
| 45 | (ester) PU | 3 | 8.3 | 70 | 1 | 20.7 | 35.2 | V0 |
| 46 | (ether) PU | 2 | 8.3 | 70 | 1 | 20.7 | 29.4 | V0 |
| 47 | PP/PE | 2 | 7.3 | 70 | 1 | 21.7 | 35.0 | V0 |
| 48 | PP/PE | 8 | 9.7 | 65 | 1 | 24.3 | 34.8 | V0 |
| 49 | ABS | 3 | 8.5 | 65 | 1 | 25.5 | 29.8 | V0 |

(1) APP = ammonium polyphosphate Exolit 422 ® (Hoechst)
LDPE = Low density polyethylene
HIPS = polystyrene containing 5% of butadiene rubber
(ester) PU = polyester polyurethane
(ether) PU = polyether polyurethane
PP/PE = propylene-ethylene copolymer
ABS = acrylonitrile-butadiene-styrene terpolymer
(2) AO = antioxidant
A mixture constituted by 2 parts of dilauryl thiopropionate and 1 part of pentaerythritol tetra [3-(3,5-di-ter-butyl-4-hydroxyphenyl-propionate].

EXAMPLE 50

Comparison Example 200 cm³ of water, 122 g of a solution at 37% by weight of formaldehyde and, with stirring, 63.0 g of 2,4,6-triamine-1,3,5-triazine (melamine) are charged to a reactor of 0.5 liter of capacity, equipped as disclosed hereinabove in Example 1.

The reaction mass is heated at 60° C. for 20 minutes, until a solution is obtained.

Such a solution, kept at 60° C., is added, during approximately 1 hour, to a 2 liter reactor, equipped as in Example 1, containing 500 cm³ of water and 1.9 g of sulfuric acid at 96%, heated at 90° C.

A white precipitate is formed.

The reaction mass is kept at 90° C. during 3 hours. 400 cm³ of water are added, with the reaction temperature being allowed to decrease down to 60° C., and the dispersion is subsequently neutralized by means of the addition of 2.0 g of sodium carbonate.

The dispersion is kept heated at 60° C. for a further hour, then the resulting product is filtered off, and the filter cake is washed on the same filter with hot water.

By drying the filter cake in an oven at 100° C. and submitting the dried cake to a subsequent thermal treatment at 150° C. for 2 hours under vacuum, 78 g of resin are obtained as a white crystalline powder having a melting point higher than 300° C.

By operating according to the same modalities as used in Examples Nos. 17-39, using the resin obtained as said above, the following composition is prepared:

| | |
|---|---|
| polypropylene: | 75 parts by weight |
| antioxidant: | 1 part by weight |
| ammonium polyphosphate: | 17 parts by weight |
| melamine-formaldehyde resin: | 7 parts by weight |

By using the above said composition, specimens were prepared, which were submitted to self-extinguishment tests according to the previously disclosed modalities.

The following results were obtained:

L.O.I. = 23.8
UL94 (3 mm): class B (the specimen burns).

We claim:

1. Self-extinguishing polymeric compositions comprising:

(a) from 90 to 40 parts by weight of a thermoplastic polymer, or of a polymer endowed with elastomeric properties;
   (b) from 6 to 33 parts by weight of one or more ammonium or amine phosphate and/or phosphonates;
   (c) from 4 to 27 parts by weight of one or more aminoplastic resin(s), obtained by means of the polymerization of a mixture comprising:
      (1) from 0 to 50 parts by weight of one or more polyaminic derivatives;
      (2) from 50 to 100 parts by weight of one or more derivatives of 2,4,6-triamino-1,3,5-triazine having the general formula (I):

$$\begin{array}{c} R \diagdown \diagup R_1 \\ N \\ \| \\ N \quad N \\ R_3 \diagdown \quad \diagup R_2 \\ N \quad N \\ \diagup \quad \diagdown \\ H \quad \quad H \end{array} \qquad (I)$$

with formaldehyde or a mixture of formaldehyde and an aldehyde having formula (II):

$$R_4-CHO \qquad (II)$$

wherein the aldehyde having formula (II) can be present in an amount of up to 20% by mol, and wherein at least one of radicals from R to $R_3$ is:

$$-\!\!\!+\!C_mH_{2m}\!\!\!+\!\!\!-\!O\!-\!R_5$$

$$-\!\!\!+\!C_pH_{2p}\!\!\!+\!\!\!-\!N \diagup R_6 \diagdown R_6$$

wherein:
m = an integer within the range of from 2 to 8;
p = an integer within the range of from 2 to 6;
$R_5$ = H; $C_1$-$C_8$ alkyl; $C_2$-$C_6$ alkenyl; $-\!\!+\!C_qH_{2q}\!\!+\!\!-$ O—$R_7$ wherein q is an integer within the range of from 1 to 4 and $R_7$ is H or $C_1$-$C_4$ alkyl; $C_6$-$C_{12}$ cycloalkyl or alkylcycloalkyl;

the radicals $R_6$, which may be the same, or different from each other, are:

H, $C_1$-$C_8$ alkyl; $C_2$-$C_6$ alkenyl; $C_6$-$C_{12}$ cycloalkyl or alkylcycloalkyl; $C_1$-$C_4$ hydroxyalkyl; or the moiety;

is replaced by a heterocyclic radical linked to the alkyl chain through the nitrogen atom and is a radical selected from the group consisting of aziridinyl, pyrrolidinyl, piperidinyl, morpholinyl, thiomorpholinyl, piperazinyl, 4-methylpiperazinyl and 4-ethylpiperazinyl, or in formula (I) the moiety:

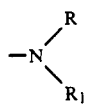

is replaced by a heterocyclic radical linked to the triazinic ring through the nitrogen atom, and optionally containing another heteroatom; the other radicals from R to $R_3$, which may be the same or different from one another, having the above said meaning, or they are: H; $C_1$-$C_{18}$ alkyl; $C_2$-$C_8$ alkenyl; $C_6$-$C_{16}$ cycloalkyl or alkylcycloalkyl, optionally substituted with a hydroxy or $C_1$-$C_4$ hydroxyalkyl function;

$R_4$ is $C_1$-$C_8$ alkyl; $C_2$-$C_6$ alkenyl; $C_6$-$C_{12}$ cycloalkyl; $C_6$-$C_{12}$ aryl; $C_7$-$C_{16}$ aralkyl; $C_8$-$C_{12}$ aralkenyl.

2. The self-extinguishing polymeric compositions according to claim 1, in which the (c) component is selected from among polycondensates obtained by resinification with formaldehyde.

3. The self-extinguishing polymeric compositions according to claim 1, in which the (c) component is selected from among polycondensates obtained by means of resinification of the only melaminic derivatives of general formula (I).

4. The self-extinguishing polymeric compositions according to claim 1, in which $R_2$ and $R_3$, in general formula (I), are equal to hydrogen.

5. The self-extinguishing polymeric compositions according to claim 1, in which the moiety:

in general formula (I) is replaced by a heterocyclic radical selected from:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine.

6. The self-extinguishing polymeric compositions according to claim 1, in which at least one of radicals from R to $R_3$ in general formula (I) is a moiety:

wherein:

m is an integer comprised within the range of from 1 to 3 and $R_5$ is hydrogen or $C_1$-$C_4$ alkyl.

7. The self-extinguishing polymeric compositions according to claim 1, in which the radical $R_4$ is selected from:

methyl; ethyl; n-propyl; isopropyl; n-butyl; isobutyl; tert-butyl; n-pentyl; isopentyl; n-hexyl; n-heptyl; isoheptyl; n-octyl; ethenyl; propenyl; isobutenyl; sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl.

8. The self-extinguishing polymeric compositions according to claim 1, in which ammonium phosphate or phosphates (b) have the general formula

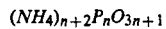

in which n is an integer equal to, or higher than, 2.

9. The self-extinguishing polymeric compositions according to claim 1, in which ammonium phosphate or phosphates (b) have the general formula

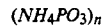

in which n is a numeral comprised within the range of from 50 to 500.

10. The self-extinguishing polymeric compositions according to claim 1, in which amine phosphate(s) (b) are selected from dimethylammonium or diethylammonium phosphate; ethylenediamine phosphate; or melamine ortho- or pyrophosphate.

11. The self-extinguishing polymeric compositions according to claim 1, in which ammonium phosphonate(s) (b) are mono- and polysubstituted ammonium phosphonates and are selected from salts deriving from mono- and polyphosphonic acids.

12. The self-extinguishing polymeric compositions according to claim 1, in which polymer (a) is selected from polymers or copolymers of olefins having the general formula

wherein R is a hydrogen atom or a $C_1$-$C_8$ alkyl or aryl radical; acrylonitrile/butadiene/styrene (ABS) and styrene/acrylonitrile (SAN) copolymers; polyurethane; poly (ethylene terephthalate); poly (butylene terephthalate); polyamides.

13. The self-extinguishing polymeric compositions according to claim 15, wherein olefinic polymers and copolymers are selected from:

1. isotactic or prevailingly isotactic polypropylene;
2. HDPE, LLDPE, LDPE polyethylene;
3. crystalline propylene copolymers with minor proportions of ethylene and/or other alpha-olefins, such as 1-butene, 1-hexene, 1-octene, 4-methyl-1-pentene;
4. heterophasic compositions comprising: (A) a homopolymeric propylene fraction, or one of copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;

5. elastomeric ethylene copolymers with alpha-olefins, possibly containing minor proportions of a diene.

14. The self-extinguishing polymeric compositions according to claim 1, wherein the polyaminic derivative is selected from the group of compounds containing the 1,3,5-triazine ring or at least one carbonyl and/or thiocarbonyl moiety and which is selected from the group consisting of urea, ethyleneurea, propyleneurea, thiourea, ethylenethiourea, melamine, actoguanamine, propionoguanamine, butyroguanamine, isobutyroguanamine, caprinoguanamine, succinoguanamine, benzoguanamine, meta methylbenzoguanamine, benzylguanamine, hydantoin, piperazine-2,5-dione and barbituric acid.

15. A molded article of manufacture prepared from the composition of claim 1.

* * * * *

UNITED STATES PATENT AND TRADEMARK OFFICE
CERTIFICATE OF CORRECTION

PATENT NO. : 5,302,640
DATED : April 12, 1994
INVENTOR(S) : Roberto CIPOLLI, et al.

It is certified that error appears in the above-indentified patent and that said Letters Patent is hereby corrected as shown below:

On the title page, Item [73], the Assignee's name should read as follows:

--Ministero Dell 'Universita' E Della Ricerca Scientifica E Tecnologica, Rome, Italy--

Signed and Sealed this

Twenty-sixth Day of July, 1994

Attest:

BRUCE LEHMAN

*Attesting Officer*      *Commissioner of Patents and Trademarks*